METHOD OF MAKING A LAMINATED FERRITE MEMORY
Filed Dec. 13, 1965
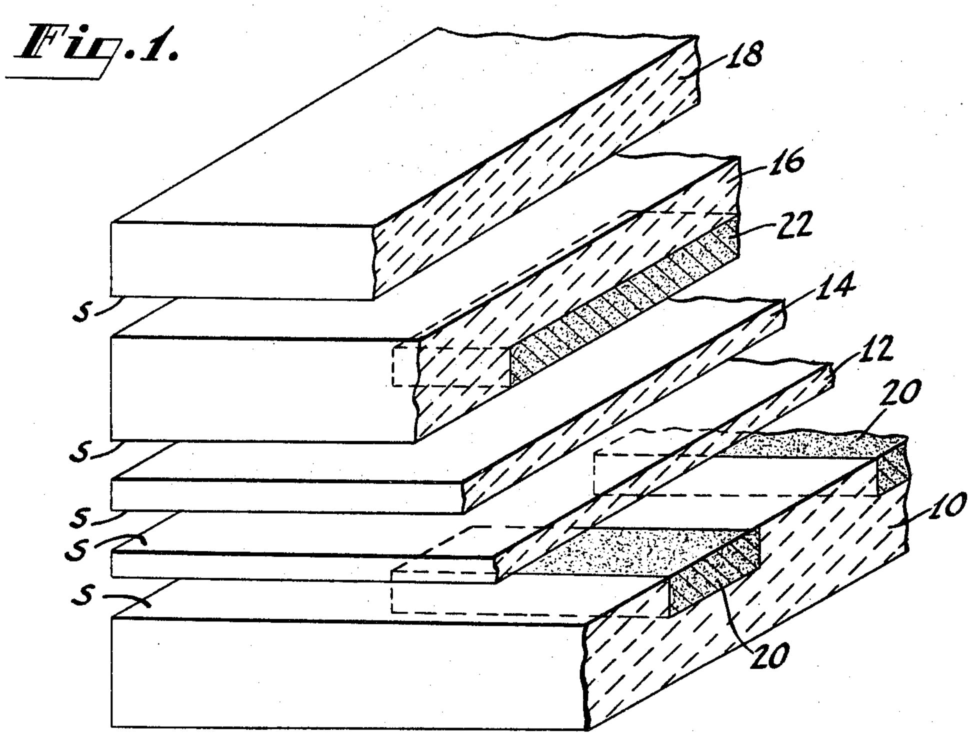
FIG. 2.
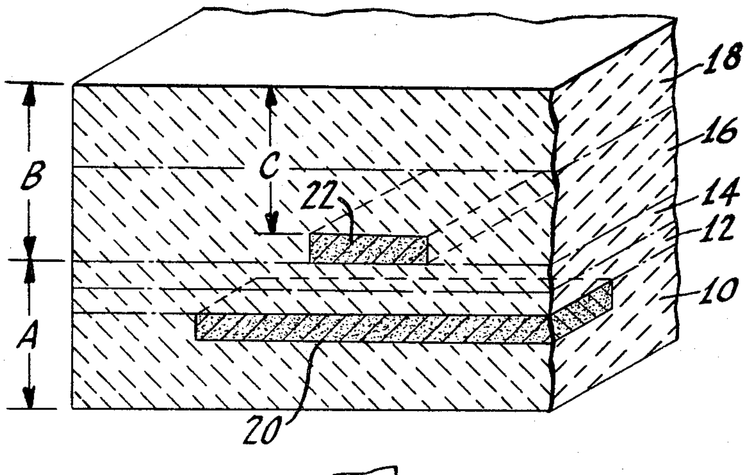
FIG. 3.
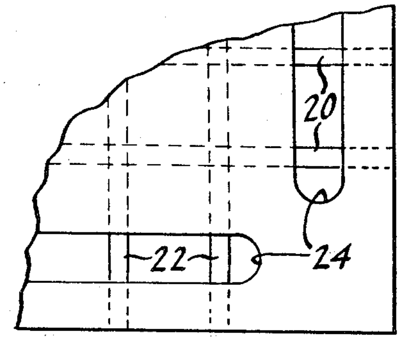
Inventor:
JOSEPH J. COSGROVE
BY Carl V. Olson
Attorney United States Patent Office 3,400,455
Patented Sept. 10, 1968

3,400,455
METHOD OF MAKING A LAMINATED FERRITE MEMORY

Joseph J. Cosgrove, Walpole, Mass., assignor to Radio Corporation of America, a corporation of Delaware
Filed Dec. 13, 1965, Ser. No. 513,318
9 Claims. (Cl. 29—604)

ABSTRACT OF THE DISCLOSURE

A method of making a laminated ferrite memory plane having two sets of imbedded conductors. A lamination is made from five individual green ferrite sheets, two of which are relatively thin and two of which are relatively thick and have flush imbedded conductors. Each green ferrite sheet has one shiny side after removal from a smooth substrate. The green ferrite sheets are assembled in the order of a first thick sheet placed with shiny and conductor side up, a first thin sheet placed with shiny side up, a second thin sheet placed with shiny side down, a second thick sheet placed with shiny and conductor side down and a final sheet placed shiny side down, the assembly is subjected to heat and pressure to form a lamination, and is then fired to produce a homogeneous body of sintered magnetic ferrite having imbedded conductors.

This invention relates to magnetic memories such as are useful in electronic data processing equipment, and particularly to a method of making an array of magnetic memory elements linked by conductors and consisting of a homogeneous body of sintered magnetic ferrite having imbedded conductors.

Laminated ferrite memories are constructed by first forming a plurality of thin leather-like sheets of green ferrite by doctor blading a ferrite slurry over a smooth surface. Paste conductors are formed on one surface of at least two of the green ferrite sheets. The green ferrite sheets are then assembled in a sandwich which is laminated by the application of heat and pressure. The lamination is then fired to form a homogeneous body of sintered ferrite having imbedded conductors. Laminated ferrite memories are described in greater detail in articles by R. A. Shahbender et al. appearing in the Intermag Conference Record, Washington, D.C., April 1964; the Proceedings of the 1964 Fall Joint Computer Conference, San Francisco, Calif., Oct. 25, 1964; and the RCA Engineer 10–3, October-November 1964.

In the electromagnetic operation of an array of magnetic memory elements, it is very important that there be a high degree of uniformity in the characteristics of the many individual memory elements. When stored information is read from selected memory elements of an array, particularly at high operating speeds, the electrical sense signals are small in amplitude, and there is only a small difference between a sense signal representing a "0" and a sense signal representing a "1." Therefore, the provision of a laminated ferrite memory capable of most reliable operation at high operating speeds requires a high degree of uniformity in the characteristics of the individual memory elements, which in turn is achieved by constructing the laminated ferrite memory to have a very high degree of uniformity in the dimensional and physical characteristics of the homogeneous sintered ferrite body and the conductors imbedded therein.

It is a general object of this invention to provide a method of constructing a laminated ferrite memory having electromagnetic characteristics of improved uniformity and reliability in operation.

It is another opject to provide a method of constructing a laminated ferrite memory having an improved homogeneity in the body of sintered ferrite.

It is yet another object to provide a method of constructing a laminated ferrite memory having conductors imbedded therein in planes spaced from the outer surfaces of the ferrite body by amounts providing improved electromagnetic operation of the memory.

It is yet a further object of the invention to provide a method of constructing a laminated ferrite memory with improved electrical connections to terminals of imbedded conductors.

In accordance with an example of the method of the invention, two sets of parallel paste conductors are laid down on a smooth substrate. A ferrite slurry is doctor bladed over the sets of paste conductors to form two thick sheets of green ferrite having recessed paste conductors that terminate short of the peripheral edges of the green ferrite sheets. Two thin sheets of green ferrite and a fifth sheet of green ferrite are also doctor bladed on a smooth substrate. The thicknesses of the five sheets are selected so that the combined thickness of one thick sheet and two thin sheets is slightly less than the combined thickness of one thick sheet and the fifth sheet. The green ferrite sheets, when dried and removed from the substrates, have a shiny side determined by the smooth substrate and have an opposite dull side. The five green ferrite sheets are assembled in a sandwich in the order of a first thick sheet and a first thin sheet both placed shiny side up, a second thin sheet, a second thick sheet and the fifth sheet all placed shiny side down. The first and second thick sheets are placed with their conductors in orthogonal relationship. The sandwich of green ferrite sheets is laminated by the application of heat and pressure, the lamination is heated to drive out binders, and the lamination is fired to sinter the ferrite. Finally, a surface of the sintered ferrite body is abraded to provide troughs communicating with terminal ends of imbedded conductors for making electrical connections thereto.

In the drawing:

FIG. 1 is a fragmentary expanded view illustrating the assembly of green ferrite sheets in the construction of a laminated ferrite memory array;

FIG. 2 is a fragmentary sectional view of the sheets of FIG. 1 after lamination and sintering to form a homogeneous sintered magnetic ferrite body having imbedded conductors; and FIG. 3 is a fragmentary view of a surface of the ferrite body after troughs have been abraded to expose terminal ends of imbedded conductors for making electrical connection thereto.

Reference is now made in greater detail to FIG. 1 of the drawing which shows a first thick green ferrite sheet 10, a first thin or thinner green ferrite sheet 12, a second thin or thinner green ferrite sheet 14, a second thick green ferrite sheet 16, and a fifth green ferrite sheet 18. The first thick green ferrite sheet 10 has flush-imbedded conductive paste conductors 20, and the second thick green ferrite sheet 16 has flush-imbedded conductive paste conductors 22 disposed in orthogonal relation with the paste conductors 20. The conductive paste is preferably a paste made from an organic binder and palladium particles.

The thick green ferrite sheets 10 and 16 with imbedded conductors 20 and 22 may be constructed by pressing conductive paste through a stencil onto a smooth substrate. Then, a ferrite slurry is doctor bladed over the paste conductors on the substrate to an accurately controlled thickness. After the ferrite slurry dries, the resulting leather-like or paper-like green ferrite sheets having flush-imbedded conductors are easily removed from the smooth substrate. The method of making the thick green ferrite sheets 10 and 16 with flush-imbedded conductors is described in detail in patent application, "Method of Making Magnetic Ferrite Sheet With Imbedded Conductors," Ser. No. 201,626, filed on June 11, 1962, by Robert L. Noack, and assigned to the assignee of this present application.

The green ferrite sheets 12, 14 and 18 are made by simply doctor blading a ferrite slurry over a plain smooth substrate, the height of the doctor blade over the substrate being set to provide resulting plain green ferrite sheets of desired thicknesses. The thin green ferrite sheets 12 and 14 are made equal in thickness, and the fifth sheet 18 is made to have a different thickness which may be intermediate the thickness of thin sheets 12 and 14 and thick sheets 10 and 16. In order to achieve a desired final thickness of a dried green ferrite sheet, an appropriate allowance must be made for the shrinkage which occurs when the ferrite slurry dries. The height of the doctor blade drawn over the substrate and across the ferrite slurry must be set to a value which takes account of the shrinkage on drying. The ferrite slurry shrinks on drying to from ⅖ to ⅓ of its original doctor-bladed thickness.

By way of example, the green ferrite sheets 10, 12, 14, 16 and 18 may have thicknesses of 2.4, 0.6, 0.6, 2.4 and 2.0 milli-inches, respectively. According to another example, the green ferrite sheets 10, 12, 14, 16 and 18 may have thicknesses of 2.0, 0.8, 0.8, 2.0 and 2.4 milli-inches, respectively. The flush-imbedded paste conductors 20 and 22 may have a width of 3 milli-inches, a thickness of about 0.7 milli-inch and a center-to-center spacing in the same plane of 15 milli-inches. The dimensions, given by way of example, have been found to result in final laminated ferrite memory arrays having greatly improved operating characteristics and economic advantages in production.

The thicknesses of the individual green ferrite sheets are selected to satisfy certain relative-thickness relationships. The combined thickness of the first thick sheet 10 and the first and second thinner sheets 12 and 14 are made to be in the range of 10% to 30% less than the combined thickness of the second thick sheet 16 and the fifth sheet 18. When this thickness relationship is observed, the thickness of magnetic material above the conductors 22 is equal to or slightly greater than the thickness of magnetic material below the conductors 22. The conductors 22 are employed in the memory as word conductors. The material thicknesses specified insure that a read pulse applied to a word conductor 22 is capable of completely clearing all magnetic information flux along the word conductor. The dimensions insure the flux-clearing action by providing enough magnetic material above the word conductor 22 to avoid limiting of the flux around the conductor. The dimensions accomplish this result without placing an unnecessarily large burden on the amplitudes of read pulses directed through the conductor. The dimensions specified also have the unexpected beneficial result of making the operation of the memory array relatively immune to stray magnetic fields such as may be caused by nearby objects of materials capable of affecting magnetic fields.

The two thin green ferrite sheets 12 and 14 are made as thin as possible to minimize the final spacing between the conductors 20 and the conductors 22. The thin ferrite sheets 12 and 14, being of ferrite material, provide insulation between the conductors 20 and 22. The spacing between conductors 20 and 22 can be made closer, without danger of short circuits, when two green ferrite spacer sheets 12 and 14 are employed in place of a single green ferrite sheet. The statistical probability of slight low-resistance imperfections being in registry in two sheets is very remote.

Having described factors concerning the thicknesses of the green ferrite sheets, attention will now be directed to considerations important in achieving intimate void-free homogeneous bonds at the interfaces between the several green ferrite sheets. After a ferrite slurry has been doctor bladed on a smooth substrate such as glass, the ferrite slurry dries and shrinks in the thickness direction. The surface of the ferrite which is on the glass substrate assumes a smooth shiny characteristic determined by the glass substrate. The upper surface of the ferrite in drying and shrinking has a relatively dull appearance. Therefore, each dried green ferrite sheet after removal from the glass substrate has a shiny side and an opposite dull side.

The assembly of the five green ferrite sheets shown in FIG. 1 into a sandwich for lamination is performed with careful consideration given to the shiny and dull sides of each ferrite sheet. In FIG. 1, the shiny side of each green ferrite sheet is indicated by a legend *s*. In assembling the green ferrite sheets, the first thick ferrite sheet 10 is placed shiny side up, and the first thin ferrite sheet 12 is also placed shiny side up. Thereafter, the green ferrite sheets 14, 16 and 18 are each placed in order shiny side down. In this arrangement of the five green ferrite sheets, there is no interface where the dull side of one sheet contacts the dull side of another sheet. The contacting surfaces at the interface between the two thin sheets 12 and 14 are both shiny sides. At all other interfaces, there is a shiny side of one sheet in contact with the dull side of another sheet. The avoidance of an interface having the dull sides of two sheets in contact is important in achieving a final void-free and completely homogeneous body of sintered ferrite. Two dull sides form a relatively weak bond that adversely affects binder removal and increases warpage and the probability of mechanical failure.

There are two other ways of assembling the five green ferrite sheets while avoiding an interface involving two dull sides. However, each of the other two arrangements results in an interface including the conductors 20, which is slightly different from the interface including the conductors 22. Therefore, the illustrated arrangement for avoiding an interface including two dull surfaces is preferred.

The five green ferrite sheets with imbedded conductors as shown in FIG. 1 are laminated together by the application of heat at a temperature in the range of from 90° C. to 100° C. and the application of pressure at about 10,000 pounds per square inch. The organic binders in the ferrite lamination are then removed by heating the lamination in a vacuum at the rate of 50° C. per hour until a temperature of 400° C. is reached. The lamination is held at 400° C. for three hours. The heating to remove organic binders is performed in a vacuum to minimize oxidation of the imbedded palladium paste conductors. The oxide can cause cracking of the ferrite. After the binders are thus removed, the lamination is rapidly heated in air to a sintering temperature of about 1150° C., which is maintained for about nine hours.

FIG. 2 illustrates a fragment of a resulting homogeneous sintered ferrite body having sets of orthogonal imbedded conductors 20 and 22. The thickness dimension designated A results from the combined thickness of the original green ferrite sheets 10, 12 and 14. The thickness dimension designated B results from the combined thickness of the original green ferrite sheets 16 and 18. The thickness A is in the range of 10 to 30 percent less than the thickness B. The thickness A from the bottom of conductor 22 to the bottom of the ferrite body is equal to or slightly less than the thickness designated C from the top of the conductor 22 to the top of the sintered ferrite body.

The conductors 20 and 22 in the green ferrite lamination have terminal ends within the ferrite and not extending to the peripheral edges of the ferrite. This arrangement has been found to be important because when the green ferrite sheets are made with conductors extending to the peripheral edges of the sheets, a physical distortion occurs during the lamination process. This distortion often results in fractures of the ferrite lamination when it is fired to sinter the ferrite. After the green ferrite sheets are laminated, the lamination may be trimmed so that the conductors 20 and 22 extend to the peripheral edges. The trimmed lamination is then fired to sinter the ferrite.

FIG. 3 shows a fragmentary portion of a major surface (the bottom surface in FIG. 2) of the sintered ferrite body. The terminal ends of the conductors 20, 22 are exposed by abrading troughs 24 in the surface of the sintered ferrite body nearest to the conductors 20. The troughs 24 are eroded using a jet of aluminum oxide abrasive particles. Electrical connections are made to the exposed terminal ends of the individual conductors by a soldering process.

The described steps of the method of making an array of magnetic memory elements linked by conductors results in a memory array having superior uniformity and reliability in the operation of storing and retrieving digital information. Stated another way, the described method of construction results in a much larger yield of units having the necessary and desirable characteristics.

What is claimed is:

1. The method of making an array of magnetic memory elements linked by conductors, comprising the steps of forming first and second thick sheets of green ferrite each having a set of conductors on one side thereof, forming first and second thinner sheets and a fifth sheet of green ferrite, assembling said green ferrite sheets in a sandwich in the order of a first thick sheet placed conductor side up, a first thinner sheet, a second thinner sheet, a second thick sheet placed conductor side down, and a fifth sheet, the combined thickness of said first thick sheet and said first and second thinner sheets being less than the combined thickness of said second thick sheet and said fifth sheet, laminating said sandwich using heat and pressure, and firing the lamination to sinter the ferrite.

2. The method as defined in claim 1 wherein the combined thickness of said first thick sheet and said first and second thinner sheets is selected to be in the range of 10% to 30% less than the combined thickness of said second thick sheet and said fifth sheet.

3. The method as defined in claim 1 wherein said first and second thinner sheets are selected to be equal in thickness, and said fifth sheet has a thickness intermediate the thickness of said first and second thinner sheets and said first and second thick sheets.

4. The method as defined in claim 1 wherein each of said green ferrite sheets is formed by doctor blading a ferrite slurry so that each sheet has a shiny side and a dull side, and wherein said green ferrite sheets are assembled so that at each interface at least one of the contacting sides is a shiny side.

5. The method as defined in claim 4 wherein said green ferrite sheets are assembled with the first thick sheet and the first thinner sheet placed shiny side up, and with the second thinner sheet, the second thick sheet and the fifth sheet placed shiny side down.

6. The method as defined in claim 1 wherein the conductors on the thick sheets of green ferrite have ends spaced from the peripheral edges of the green ferrite lamination, and the additional steps of trimming the green ferrite lamination, and cutting troughs in a major surface of the sintered ferrite lamination to expose conductors imbedded therein for electrical connections.

7. The method as defined in claim 6 wherein the cutting of troughs is done by a jet of abrasive particles.

8. The method of making an array of magnetic memory elements linked by conductors, comprising the steps of forming two sets of parallel paste conductors on a smooth substrate, doctor blading a ferrite slurry over said sets of paste conductors to form two thick sheets of green ferrite with recessed paste conductors that do not extend to the peripheral edges of the green ferrite sheets, and doctor blading two thin sheets of green ferrite and a fifth sheet of green ferrite on a smooth substrate, the combined thickness of one thick sheet and two thin sheets being about 20% less than the combined thickness of one thick sheet and the fifth sheet, removing said green ferrite sheets from the substrates, all of said green ferrite sheets having a shiny side determined by the smooth substrate and having an opposite dull side, assembling said green ferrite sheets in a sandwich in the order of the first thick sheet placed shiny side up, the first thin sheet placed shiny side up, the second thin sheet placed shiny side down, the second thick sheet placed shiny side down with conductors orthogonally related to conductors on said first thick sheet and the fifth sheet placed shiny side down, laminating said sandwich with heat and pressure, heating the lamination to drive out binders, firing the lamination to sinter the ferrite, and abrading troughs in the sintered ferrite body to expose conductors imbedded therein for electrical connections.

9. The method as defined in claim 8 wherein said paste conductors are palladium paste conductors, and wherein said heating of the lamination is performed in a vacuum.

References Cited

UNITED STATES PATENTS

| | | | |
|---|---|---|---|
| 3,247,573 | 4/1966 | Noack | 29—625 |
| 3,312,961 | 4/1967 | Rajchman | 340—174 X |
| 3,333,333 | 8/1967 | Noack | 29—420.5 |
| 3,333,334 | 8/1967 | Kuliczkowski et al. | 29—420 |

JOHN F. CAMPBELL, *Primary Examiner.*

D. C. REILEY, *Assistant Examiner.*